(12) United States Patent
Yamanaka

(10) Patent No.: US 7,034,996 B2
(45) Date of Patent: Apr. 25, 2006

(54) OPTICAL TRANSMISSION APPARATUS

(75) Inventor: Shigeo Yamanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/857,021

(22) Filed: Jun. 1, 2004

(65) Prior Publication Data
US 2005/0141079 A1    Jun. 30, 2005

(30) Foreign Application Priority Data
Dec. 26, 2003   (JP)   ............... 2003-433252

(51) Int. Cl.
H04B 10/12    (2006.01)
H04B 10/02    (2006.01)
(52) U.S. Cl. .................. 359/341.43; 398/181
(58) Field of Classification Search ........... 359/341.44, 359/341.43; 398/157, 181
See application file for complete search history.

(56) References Cited

U.S. PATENT DOCUMENTS

| 5,440,418 | A | * | 8/1995 | Ishimura et al. ............ 398/181 |
| 5,737,118 | A | * | 4/1998 | Sugaya et al. ......... 359/341.43 |
| 5,784,192 | A | | 7/1998 | Sugiyama et al. |
| 5,796,505 | A | * | 8/1998 | Ushirozawa ................ 398/157 |
| 6,057,951 | A | * | 5/2000 | Sugawara ................... 398/209 |

FOREIGN PATENT DOCUMENTS

| JP | 8-18136 | 1/1996 |
| JP | 2696064 | 9/1997 |
| JP | 11-205238 | 7/1999 |

* cited by examiner

*Primary Examiner*—Mark Hellner
(74) *Attorney, Agent, or Firm*—Oblon, Spivak, McClelland, Maier & Neustadt, P.C.

(57) ABSTRACT

An optical transmitter 11 outputs an optical signal, and an optical booster amplifier 12 amplifies the optical signal and sends the amplified optical signal to an optical fiber 101 forming an optical transmission line. When detecting an optical signal fluctuation factor, an optical transmitter control part 13 outputs a light surge warning signal 111 prior to an optical signal fluctuation, and a gain control part 14 responds to the light surge warning signal 111 to decrease the gain of the optical booster amplifier 12 down to a level where no light surge occurs.

14 Claims, 7 Drawing Sheets

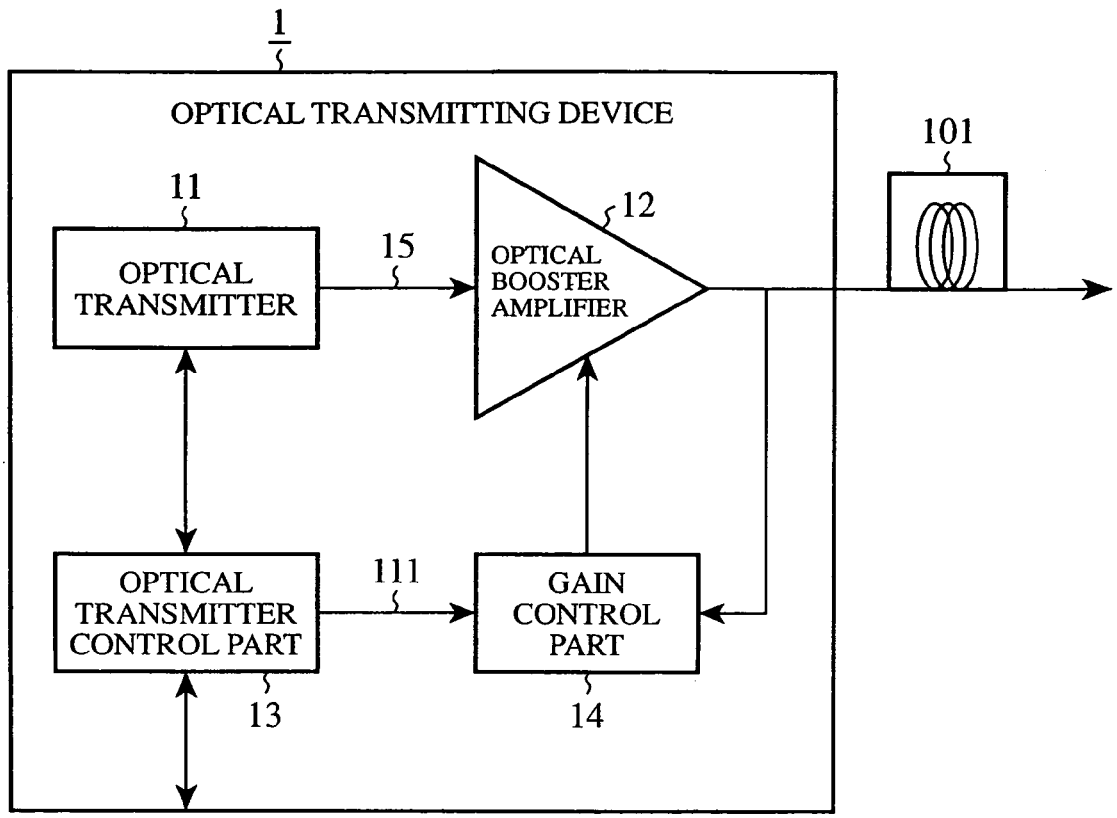

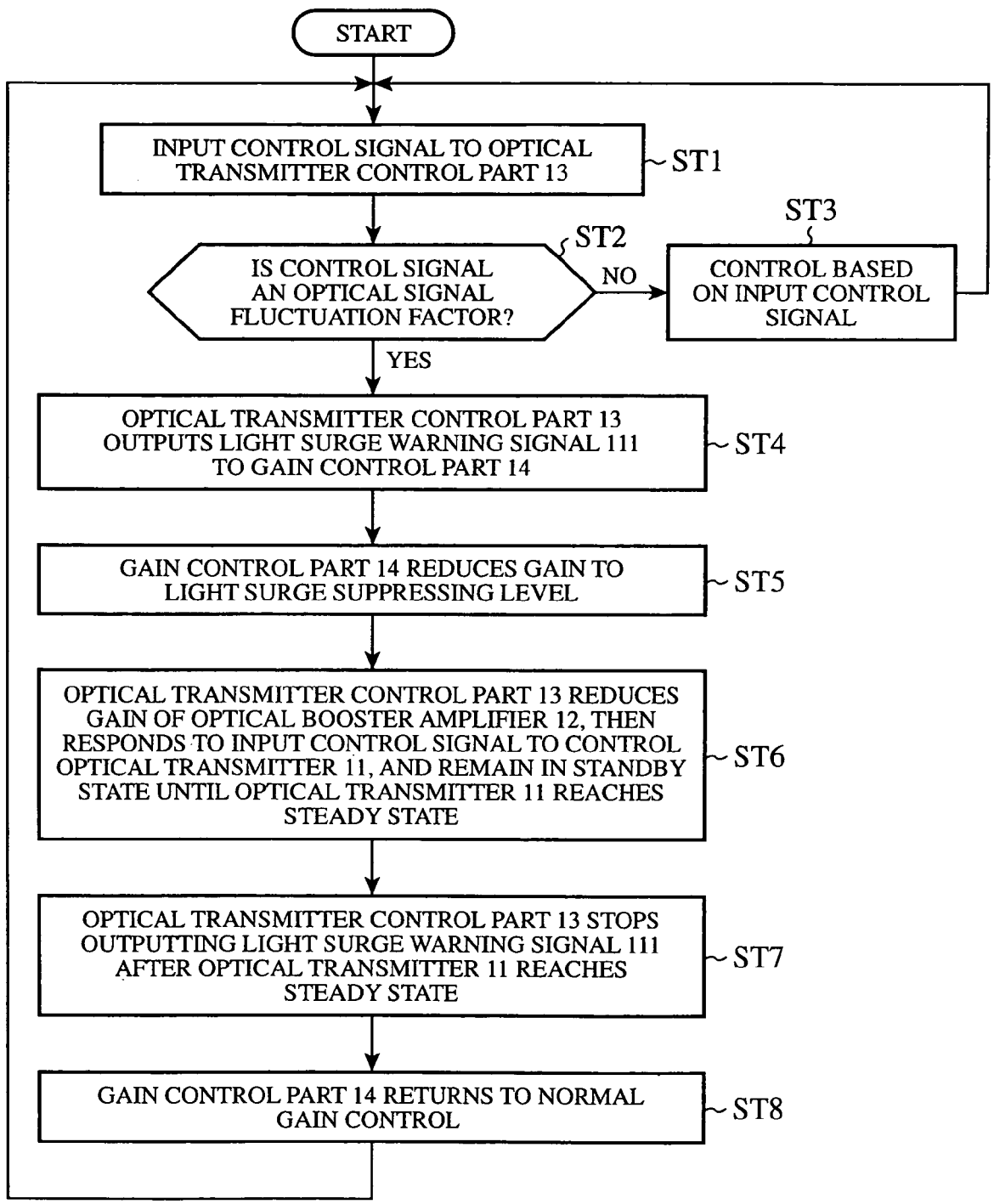

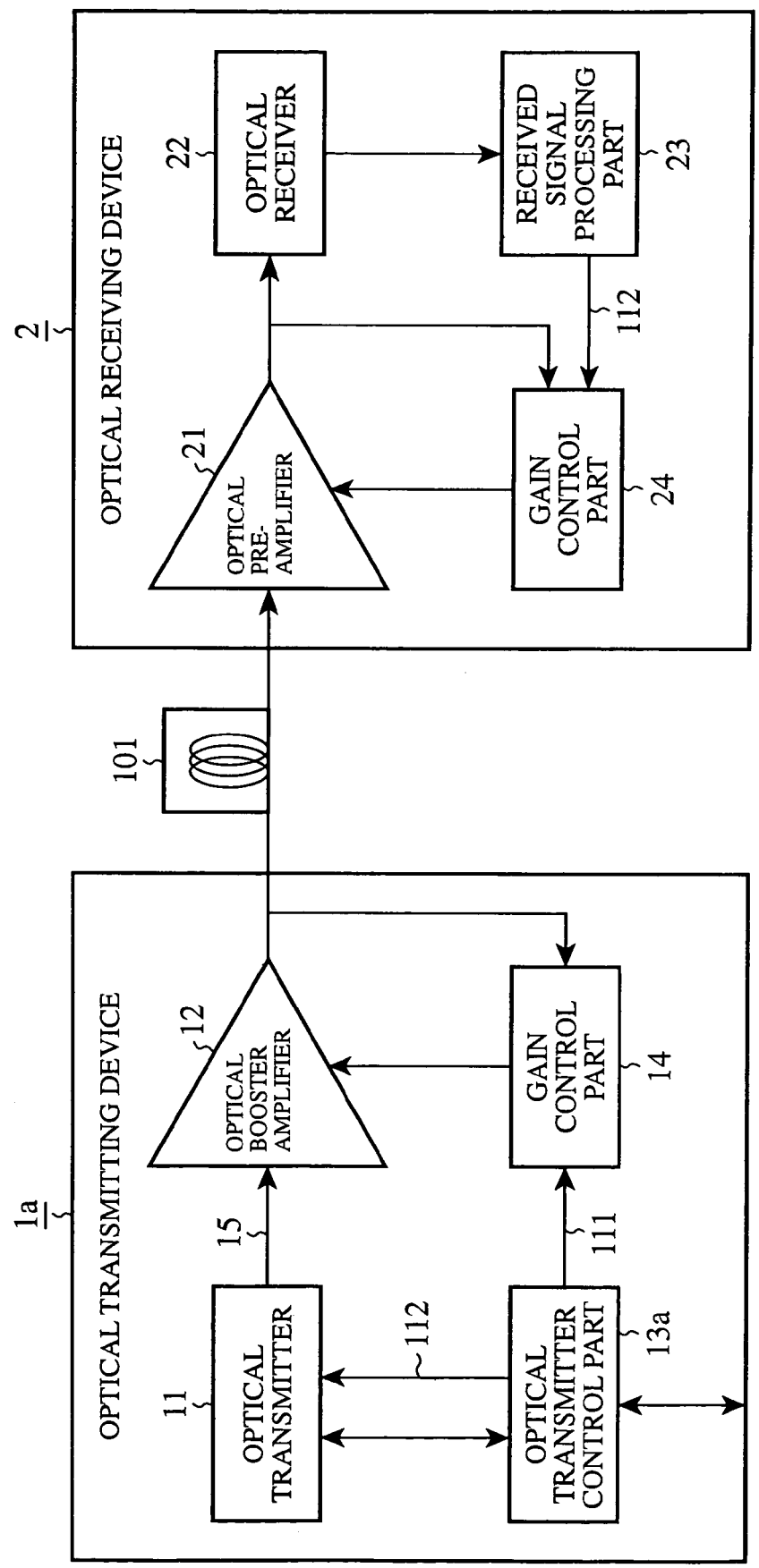

OPTICAL TRANSMISSION APPARATUS

BACKGROUND OF THE INVENTION

1. Field of the Invention

The present invention relates to an optical transmission apparatus configured to suppress or inhibit the occurrence of a light surge.

2. Description of the Related Art

Among conventional schemes for suppressing a light surge which gives rise to a problem in the use of an optical amplifier is an optical amplifier configuration disclosed, for example, in Document 1 mentioned below. The optical amplifier disclosed in Document 1 includes a detecting part for detecting the electric power of input light, a comparison part for comparing the value of the electric power of the input light with a predetermined value, and an output control part for controlling the gain or output of the optical amplifier. When the power of the input light is smaller than the predetermined value, the output control part reduces the gain or output of the optical amplifier, thereby keeping the peak value of a light surge small, which light surge may occur when the power of input light falls and then abruptly rises.

Another proposal to suppress the light surge is, for example, a light surge suppressing circuit disclosed in Document 2 mentioned below. This light surge suppressing circuit comprises a light surge compressing circuit for compressing a light surge contained in an input signal light output from an optical amplifier, and an optical output compensating circuit which during the occurrence of a sharp drop in the level of the input signal light, superimposes a pseudo signal on the input signal light to thereby make apparent compensation for the drop in the level of the input signal light. The light surge suppressing circuit is intended to prevent the occurrence of light surge and compensate for a steep drop in the input signal light level.

[Document 1] Japanese Patent No. 2696064 (paragraphs 0023, 0025, FIG. 1)

[Document 2] Japanese Patent Application Laid-Open No. 11-205238 (Summary, Means for Solving the Problem, FIG. 1)

For example, in patent document 1, since there is substantially no transmission line length between the detecting part for detecting the power of the input light and the optical amplifier, an excitation light source incorporated in the optical amplifier needs to be controlled within a very short time after the detection of a light surge, and hence no complex control is required to achieve a very high response speed therefor.

In patent document 2, there are inserted optical devices for suppressing light surge in optical transmission lines in the light surge compressing circuit and the optical output level compensating circuit, so that during normal operation their insertion losses deteriorates the quality of the optical transmission line, making it impossible to achieve high optical transmission performance. Further, since the light surge occurs in a stage preceding a light surge suppressing stage, there is a high possibility of the devices being broken down by the light surge.

SUMMARY OF THE INVENTION

It is therefore an object of the present invention to provide an optical transmission apparatus which is capable of suppressing a light surge without involving any complex control and achieving a high optical transmission performance without inserting an optical device in the optical transmission line for suppressing the light surge.

The optical transmission apparatus according to the present invention comprises: an optical transmitter for outputting an optical signal; an optical amplifier for amplifying and outputting the optical signal output from the optical transmitter; a light surge suppression control part which upon detection of an optical signal fluctuation factor causing a fluctuation of the optical signal to be fed thereto from the optical transmitter, outputs a light surge warning signal before the optical signal fluctuates; and a gain control part which responds to the light surge warning signal to decrease the gain of the optical amplifier.

According to the present invention, it is possible to suppress the light surge without involving complex control and to achieve high optical transmission performance without inserting an optical device in the optical transmission line for suppressing the light surge.

BRIEF DESCRIPTION OF THE DRAWINGS

FIG. 1 is a block diagram illustrating the configuration of an optical transmitting device in an optical transmission apparatus according to a first embodiment of the present invention;

FIG. 2 is a diagram for explaining contributing factors for causing variations of an optical signal in the optical transmitting device shown in FIG. 1;

FIG. 3 is a flowchart explanatory of a light surge suppressing operation of the optical transmitting device of FIG. 1;

FIG. 4 is a block diagram illustrating the configuration of each of an optical transmitting device and an optical receiving device in an optical transmission apparatus according to a second embodiment of the present invention;

DETAILED DESCRIPTION OF THE PREFERRED EMBODIMENTS

Figure 5:
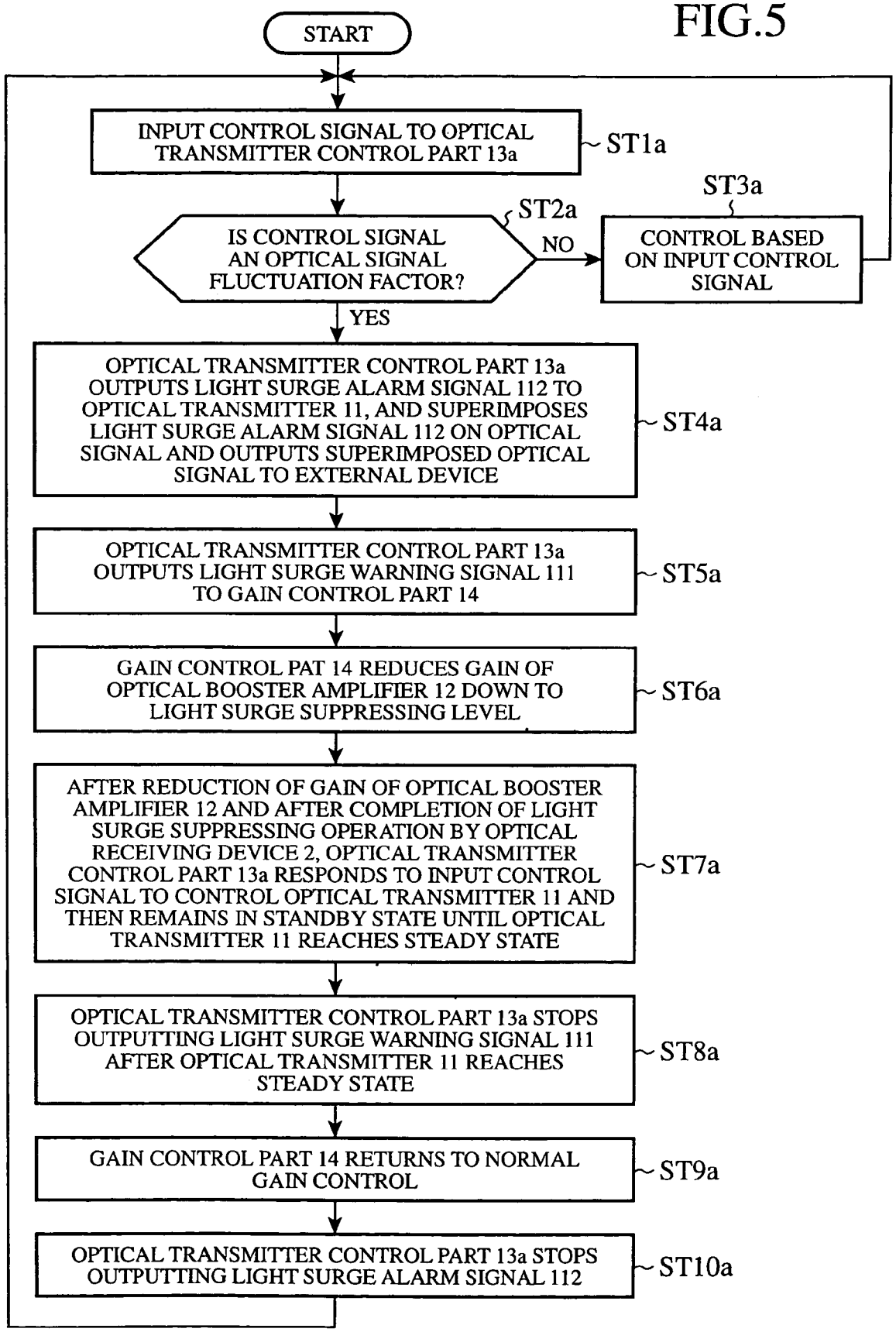
FIG. 5 is a flowchart explanatory of a light surge suppressing operation of the optical transmitting device depicted in FIG. 4.

A description will hereinafter be given of embodiments of the present invention.

Embodiment 1

FIG. 1 illustrates in block form the configuration of an optical transmitting device in an optical transmission apparatus according to a first embodiment (Embodiment 1) of the present invention. The optical transmitting device 1 is made up of: an optical transmitter 11 for outputting an optical signal; an optical booster amplifier 12 (corresponding to the optical amplifier) for amplifying and transmitting the optical signal fed from the optical transmitter 11; an optical transmitter control part 13 (corresponding to the light surge suppressing control part) which controls the optical transmitter 11 and, upon detection of a factor which fluctuates the optical signal so greatly as to cause a light surge (corresponding to the optical signal fluctuation factor), outputs a light surge warning signal 111 prior to fluctuation of the optical signal; a gain control part 14 which controls the gain of the optical booster amplifier 12; an d an optical fiber 15 which interconnects the optical transmitter 11 and the optical booster amplifier 12.

The optical transmitter 11 includes a laser diode (not shown) serving as a light emitting element, a modulating element (not shown) for modulating light from the laser diode in a predetermined signal format, and so forth. Further, the optical transmitter 11 monitors, the conditions of the laser diode and the modulating element and other elements as monitor information, such as their drive current values and temperatures, and supplies the optical transmitter control part 13 with monitor signals indicating such pieces of monitor information; and when any of such pieces of monitor information exceeds a value predetermined under a certain condition, and the element concerned under supervision goes abnormal, then the optical transmitter 11 applies an abnormality warning signal to the optical transmitter control part 13.

The optical booster amplifier 12 includes an erbium-doped fiber (not shown) and a pumping source (not shown) for launching an excitation light into the erbium-doped fiber, by which an optical signal for transmission to the outside is so amplified as to be receivable by an external device. Incidentally, the drive current for the pumping source in the optical booster amplifier 12 is placed under control of the gain control part 14.

When supplied with an external control signal indicating whether to start or stop the optical signal output operation of the optical transmitter 11 or a fluctuation in the level of the optical signal output, the optical transmitter control part 13 controls the laser diode of the optical transmitter 11 to emit light or stop the light emission, or the intensity of the laser light or controls the modulating element to modulate the laser light in a predetermined or specified signal format. Further, the optical transmitter control part 13 monitors various parameters of the laser diode such as its drive current and temperature, or the modulation scheme control of the modulating element and various parameters such as its drive current and temperature.

The optical transmitter control part 13 has stored in its internal or built-in memory (not shown) optical signal fluctuation factors such as shown in FIG. 2. The optical signal fluctuation factors cause level fluctuations of the optical signal that is applied to the optical booster amplifier 12. To be more precise, they are factors for level fluctuations of the optical signal which will allow a light surge to occur in the output from the optical booster amplifier 12, which adversely affects optical parts of the subsequent stages. The optical signal fluctuation factors of this kind are those attributable to the application of control signals to the optical transmitter. For example, when the optical transmitter 11 is controlled by each of control signals shown in FIG. 2, such as an optical signal transmission stop control signal, an optical signal transmission start control signal, an optical signal output level change control signal and a transmission signal format change control signal, fluctuations occur in the level of the optical signal that is output from the optical transmitter 11.

Another optical signal fluctuation factor is a change of state of the laser diode (not shown) or modulating element (not shown) of the optical transmitter 11 which results from its age deterioration or a change in its usage conditions. The monitor signals shown in the FIG. 2 table, such as an optical transmitter mounted laser diode drive current abnormality warning signal and an optical transmitter mounted laser diode temperature abnormality warning signal, are applied from the optical transmitter 11 to the optical transmitter control part 13 to inform it of the occurrence of the level fluctuation of the optical signal due to a change in the state of the laser diode. These monitor signals are so preset as to be output immediately before the level fluctuation is caused, by obtaining in advance the conditions under which the level fluctuation is caused by aging or usage of the element concerned from its designed theoretical and experimental values and the monitor information.

Another optical signal fluctuation factor is an external one, which is, for example, mating/demating of the optical fiber 15 interconnecting the optical transmitter 11 and the optical booster amplifier 12. The optical connector mating/demating warning signal shown in FIG. 2 is a signal that warns the mating/demating of an optical connector (not shown) of the optical fiber 15.

In Embodiment 1 an optical connector mating part (not shown) for connection to the optical connector of the optical fiber 15 is provided with a locking mechanism (not shown), and when the locking mechanism is unlocked for mating or demating of the optical connector, the optical connector mating/demating warning signal is applied to the optical transmitter control part 13. Accordingly, the optical connector mating/demating warning signal is provided to the optical transmitter control part 13 before the optical connector is actually inserted into or removed from the optical connector mating part. Incidentally, upon locking the locking mechanism after the optical connector has been inserted into or removed from the optical connector mating part, an optical connector mating/demating completion signal is applied to the optical transmitter control part 13.

Incidentally, while in the above the respective control signals, the monitor signals and the optical connector mating/demating warning signal shown in FIG. 2 have been mentioned as the optical signal fluctuation factors, it is a matter of course that there are also other optical signal fluctuation factors. The amount of light surge, which the present invention is intended to suppress, depends on the rate and amount of fluctuation in the level of the optical signal that is applied to the optical booster amplifier 12 and its state of excitation, and a permissible amount of light surge also differs with each device or equipment. Accordingly, it is preferable to choose, based on theoretical or experimental values, between the above-mentioned optical signal fluctuation factors or some other factors according to the amount of light surge and a permissible amount of light surge which depend on the function or performance of each element of the equipment used and the specifications of the devices used.

When supplied with an external signal, the optical transmitter control part 13 makes a check to see if the input signal coincides with one of the optical signal fluctuation factors shown in FIG. 2, and if so, provides the light surge warning signal 111 to the gain control part 14.

The gain control part 14 normally controls the optical booster amplifier 12 to produce a fixed output. While being supplied with the light surge warning signal 111, however, the gain control part 14 keeps the gain of the optical booster amplifier 12 at a level where no light surge occurs and, even if it occurs, its peak value will not damage optical devices at stages following the optical booster amplifier 14, such a level being precalculated for each element based on the design theoretical/experimental values.

Next, the operation of this embodiment will be described below.

When supplied from the outside of the optical transmission apparatus 1 with a data signal to be transmitted, the optical transmitter control part 13 controls the modulating element (not shown) of the optical transmitter 11 to modulate the optical signal from the laser diode (not shown) of the optical transmitter 11 based on a specified signal format and the data signal, causing the optical transmitter 11 to output an optical signal containing the data signal to be sent. Then, the optical booster amplifier 12 receives the optical signal sent over the optical fiber 15 from the optical transmitter 11 and amplifies the input optical signal. During the amplification by the optical booster amplifier 12, the gain control part 14 controls the gain of the optical booster amplifier 12 to keep constant the level of the optical signal that is output from the optical booster amplifier 12. The optical signal amplified by the optical booster amplifier 12 is sent over an optical fiber 101 forming the transmission line.

Next, a description will be given, with reference to FIG. 3, of an operation for suppressing the occurrence of light surge. FIG. 3 is a flowchart showing the light surge suppressing operation. Upon receiving a control signal from outside (step ST1), the optical transmitter control part 13 makes a check to determine if the control signal is indicative of any one of the signal fluctuation factors shown in FIG. 2, that is, if the control signal is the optical signal transmission start/stop control signal for controlling the optical transmitter 11 to emit light or stop the light emission, the optical signal output level change control signal for changing the output level of the optical signal, or the transmission signal format change control signal for changing the signal format (step ST2). When the control signal does not coincide with any of the optical signal fluctuation factors, the optical transmitter control part 13 controls the optical transmitter 11 based on the control signal (step ST3). When the control signal coincides with any one of the optical signal fluctuation factors, the optical transmitter control part 13 applies the light surge warning signal 111 to the gain control part 14 (step ST4).

On receiving the light surge warning signal 111, the gain control part 14 decreases the drive current for the excitation light source (not shown) of the optical booster amplifier 12 to reduce its gain down to a level where no light surge will not occur or a level where even if a light surge occurs, it will not destroy optical part of the following stages (step ST5).

Then, when the gain of the optical booster amplifier 12 has dropped to the light surge suppression level after a time interval preset taking into consideration the response times of the gain control part 14 and the optical booster amplifier 12 for the gain reduction, the optical transmitter control part 13 controls the optical transmitter 11 based on the external control signal, and remains in a standby state for a time interval preset for the control signal until the optical transmitter 11 responds to the control signal to start a stable, steady-state operation (step ST6).

Then, the optical transmitter control part 13 stops outputting the light surge warning signal 111 after the optical transmitter 11 has entered the steady state (step ST7).

Thereafter, when the light surge warning signal 111 is no longer applied thereto from the optical transmitter control part 13, the gain control part 14 returns to its predetermined control state from the gain reducing state for suppressing or inhibiting the occurrence of light surge (step ST8).

As described above, the optical transmitter control part 13 makes a check to see if the control signal input thereto is indicative of any one of the optical signal fluctuation factors, and if so, outputs the light surge warning signal 111 to the gain control part 14 prior to controlling the optical transmitter 11 based on the input control signal. The gain control part 14 reduces the gain of the optical booster amplifier 12 down to the level where no light surge occurs or the level where even if a light surge occurs, no optical parts of the following stage will be destroyed; that is, the optical transmission apparatus 1 performs the light surge suppressing or inhibiting operation prior to the occurrence of an optical signal fluctuation that causes a light surge. Hence, it is possible to enhance the reliability of the suppression of light surge. Further, no complex control is involved and the optical fiber at the following stage of the optical booster amplifier 12 or the optical fiber 101 forming the transmission line need not be equipped with an optical part for suppressing the light surge, such as an optical attenuator; accordingly, it is possible to achieve high transmission performance with a simple device configuration.

Moreover, upon receiving a monitor signal for the optical transmitter 11 in step ST1, the optical transmitter control part 13 makes a check in step ST2 to determine whether the monitor signal is indicative of any one of the optical signal fluctuation factors, that is, whether the monitor signal is the optical transmitter mounted laser diode drive current abnormality warning signal representing that the laser diode (not shown) becomes abnormal due to an excessive drive current or the optical transmitter mounted laser diode temperature abnormality warning signal representing that the laser diode becomes abnormal due to excessively high temperature. And when the monitor signal is indicative of such an optical signal fluctuation factor, the optical transmitter control part 14 performs step ST4. Incidentally, when the optical transmitter control part 13 responds to the monitor signal to output the light surge warning signal 111, the optical transmission apparatus 1 does not perform step ST6 and subsequent steps, holding the gain low. In such an instance, the gain control pat 14 is restored to normal control by resetting after the optical transmission apparatus 1 is recovered from abnormality through maintenance.

As described above, even when supplied with the monitor signal, too, the optical transmitter control part 13 makes a check to see if the signal is indicative of any one of the optical signal fluctuation factors, and if so, the gain of the optical booster amplifier 12 is reduced. Hence, as in the case where the optical transmitter control part 13 is supplied with the control signal as described above, the optical transmission apparatus provides for enhanced reliability in the light surge suppression and achieves high transmission performance with a simple structure. In this embodiment, the condition including the time in which the element being monitored enters the abnormal state in which the optical signal fluctuates are precalculated from designed theoretical values and experimental values, and when the monitor information coincides with that condition, the optical transmitter 11 outputs an abnormality warning signal immediately before the element being monitored becomes abnormal; however, provision may also be made for the optical transmitter control part 13 to check on the monitor information. In this case, the optical transmitter control part 13 does not perform step ST2 but instead it needs only to make a check to determine whether the content of the monitor signal indicating the drive current or temperature of the laser diode agree with the precalculated condition under which the laser diode enters the abnormal state.

Upon receiving the optical connector mating/demating warning signal in step ST1, the optical transmitter control part 13 makes a check to see if the warning signal is indicative of the optical fluctuation factor concerned in step ST2, and if so, the control part 13 applies the light surge warning signal 111 to the gain control part 14 in step ST4. The gain control part 14 responds to the light warning signal 111 to decrease the gain of the optical booster amplifier 12 in step ST5 to suppress or inhibit the occurrence of light surge. Next, when having received the optical connector mating/demating warning signal in step ST1, the optical transmitter control part 13 is on standby in step ST6 until the optical transmitter returns to the steady state, and waits for the input of the optical connector mating/demating completion signal. The optical connector mating/demating completion signal is a signal that is applied to the optical transmitter control part 13 upon locking the locking mechanism (not shown) of the optical connector mating part (not shown) for the insertion thereinto or removal therefrom of the optical connector (not shown) of the optical fiber 15 (shown in FIG. 1). Upon receiving the optical connector mating/demating completion signal, the optical transmitter control part 13 stops outputting the light surge warning signal 111 in step ST7. Then the gain control part 14 returns from the gain reducing state to the normal gain control state in step ST8.

As described above, the optical transmission apparatus 1 of this embodiment responds to the optical connector mating/demating warning signal to decrease the gain of the optical booster amplifier 12 to thereby suppress or inhibit the occurrence of light surge as described above; accordingly, also for an optical signal fluctuation that can be caused by an external factor which has nothing to do with the operation of the optical transmitter 11, such as the mating/demating of the optical fiber 15 interconnecting the optical transmitter 11 and the optical booster amplifier 15, the optical transmitting device 1 operates to suppress or inhibit the occurrence of light surge prior to the occurrence of the optical signal fluctuation which causes the light surge. Hence, as is the case with the control signal or monitor signal described above, the optical transmitting device 1 of this embodiment provides for increased reliability in the suppression of light surge and achieves high transmission performance with a simple device configuration.

As described above, according to this embodiment, the optical transmitting device 1 prestores factors of fluctuation of the optical signal from the optical transmitter 11 to the optical booster amplifier 12 which cause a light surge in the output from the latter, and upon detecting such an optical signal fluctuation factor, the optical transmitting device 1 operates for suppressing or inhibiting the occurrence of light surge before the optical signal fluctuates. Hence, this embodiment increases the reliability of suppression of light surge, and neither involves such complex control as is needed in the prior art nor calls for inserting an optical part in the optical fiber 101 for the suppression of light surge, achieving high transmission performance with a simple device configuration.

Embodiment 2

FIG. 4 illustrates in block form an optical transmitting device and an optical receiving device in an optical transmission apparatus according to a second embodiment 2 (Embodiment 2). Those parts corresponding to the components of FIG. 1 are identified with the same reference numerals, and no description will be repeated. An optical transmitting device 1a is identical in construction with the optical transmitting device 1 of FIG. 1 except that an optical transmitter control part 13a superimposes a light surge alarm signal 112, as a monitor signal, on the optical signal from the optical transmitter 11 so as to warn an external device of the possibility of the occurrence of light surge. The optical transmitting device 1a and the optical receiving device 2 in this embodiment form part of an optical transmission system in which the suppression of light surge in the optical receiving device 2 is suppressed by use of the light surge alarm signal 112 sent from the optical transmitting device 1a.

The optical receiving device 2 is made up of: an optical pre-amplifier 21 (corresponding to the optical amplifier) which receives and amplifies an optical signal sent over the optical fiber 101 from the optical transmitting device 1a and outputs the amplified optical signal; an optical receiver 22 which receives the amplified received optical signal from the optical per-amplifier 21; a received signal processing part 23 which performs signal processing of the received optical signal from the optical receiver 22 to extract a monitor signal and, when the monitor signal is the light surge alarm signal 112, outputs the light surge alarm signal 112; and a gain control part 24 which reduces the gain of the optical pre-amplifier 21 when it has received the light surge warning signal 112 from the received signal processing part 23.

Figure 6:
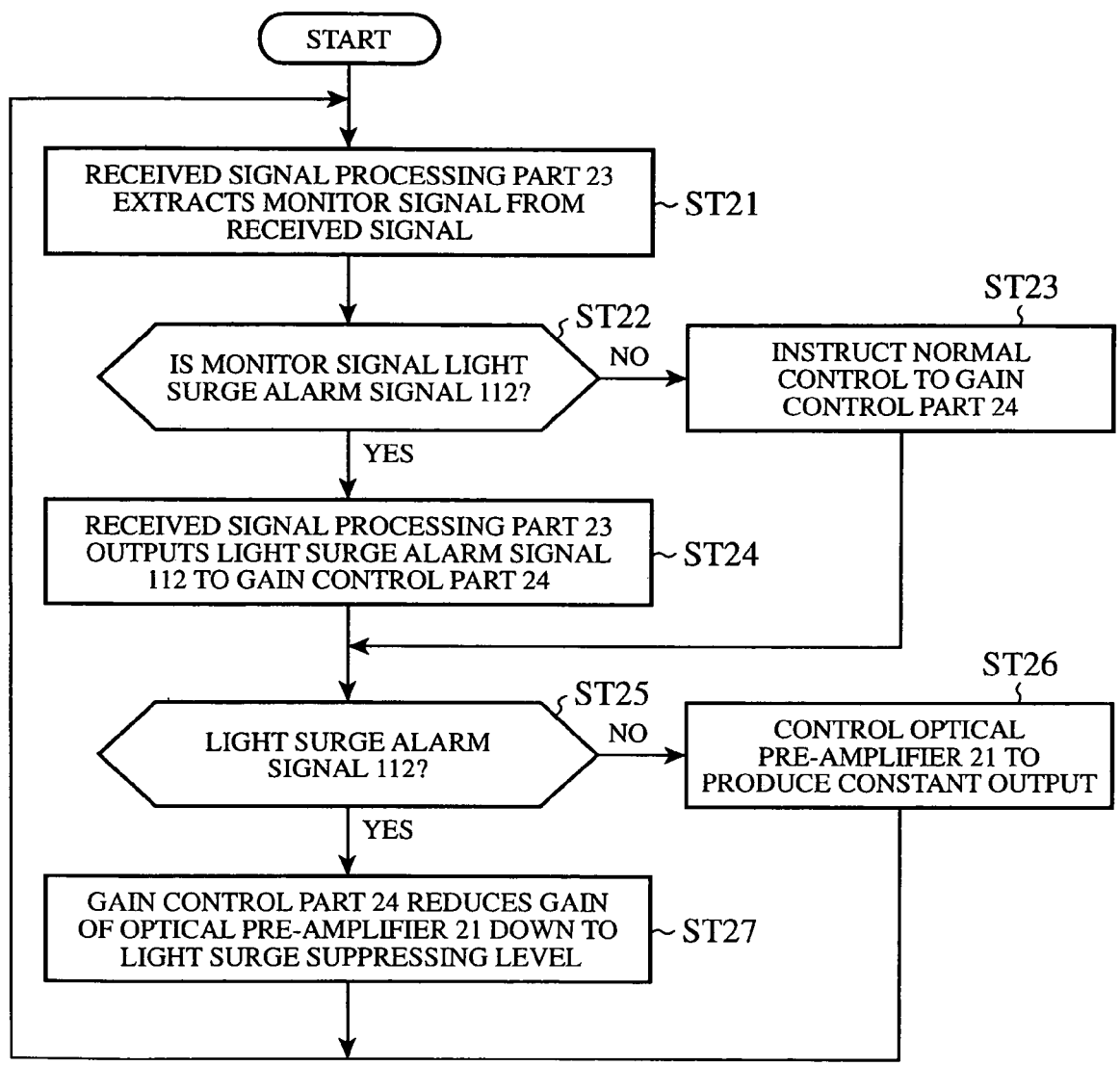
FIG. 6 is a flowchart explanatory of a light surge suppressing operation of the optical receiving device depicted in FIG. 4.

The operation of this embodiment will be described below. FIG. 5 is a flowchart showing a light surge suppressing operation of the optical transmitting device 1a, and FIG. 6 is a flowchart showing a light surge suppressing operation of the optical receiving device 2. As depicted in FIG. 5, upon receiving a control signal from outside (step ST1a), an optical transmitter control part 13a makes a check to determine if the control signal is an optical signal fluctuation factor (step ST2a), and if not, then the control part 13a controls the optical transmitter 11 based on that control signal (step ST3a). On the other hand, when the control signal is indicative of any one of the optical signal fluctuation factors, the optical transmitter control part 13a applies the light surge warning signal 112 as a monitor signal to the optical transmitter 11 and controls it to superimpose the light surge alarm signal 112 on its output together with other monitor signals and to output an optical signal having the light surge alarm signal 112 superimposed thereon to an external device (step ST4a). Incidentally, the superimposition of monitor signals on the optical signal is performed during steady-state operation, and is not accompanied by the optical signal fluctuation which leads to the occurrence of light surge. Then, the optical transmitter control part 13a sends the light surge alarm signal 112 to the external device, thereafter outputting the light surge warning signal 111 to the gain control part 14 (step ST5a).

On receiving the light surge warning signal 111, the gain control part 14 decreases the drive current for an excitation source (not shown) of the optical booster amplifier 12 to reduce the gain of the amplifier 12 down to a level at which no light surge occurs, or a level at which even if a light surge occurs, no optical parts of the subsequent stages will be destroyed (step ST6a).

Then, when the gain of the optical booster amplifier 12 has been reduced down to the light surge suppression level after a time interval preset in anticipation of the response time of the amplifier 12 for gain reduction, and when the gain of the optical pre-amplifier 21 of the optical receiving device 2 has been reduced down to the light surge suppression level in response to the light surge alarm signal 112 (in Embodiment 2, after a precalculated propagation time of the light surge alarm signal 112 and a precalculated time from the reception of the light surge alarm signal 112 by the optical receiving device 2 to the reduction of gain down to the light surge suppression level have elapsed), the optical transmitter control part 13a controls the optical transmitter 11 based on a control signal, and remains in a standby state for a time interval preset for the control signal until the optical transmitter 11 responds to the control signal to start a stable, steady-state operation (step ST7a).

Then, the optical transmitter control part 13a stops outputting the light surge warning signal 111 after the optical transmitter 11 has entered the steady state (step ST8a).

Thereafter, when the light surge warning signal 111 is no longer applied thereto from the optical transmitter control part 13a, the gain control part 14 returns to its predetermined control state from the gain reducing state for suppressing or inhibiting the occurrence of light surge (step ST9a).

Then, the optical transmitter control part 13a stops outputting the light surge alarm signal after the gain control part 14 and the optical booster amplifier 12 have returned to their steady state (step ST10a).

The optical pre-amplifier 21 of the optical receiving device 2 receives the optical signal sent over the optical fiber 101 from the optical transmitting device 1a and amplifies the optical signal to a level suitable for reception by the optical receiver 22, thereafter outputting the amplified signal. The optical receiver 22 receives the received optical signal amplified by the optical pre-amplifier 21, and provides it to the received signal processing part 23.

Turning next to FIG. 6, a description will be given of the light surge suppressing operation of the optical receiving device 2. The received signal processing part 23 processes the received optical signal from the optical receiver 22 to extract a monitor signal (step ST21), then makes a check to see if the extracted monitor signal contains the light surge alarm signal 112 (step ST22), and if not, then instructs the gain control part 24 to perform normal gain control (step ST23). On the other hand, when the light surge alarm signal 112 is contained, the received signal processing part 23 applies the signal 112 to the gain control part 24 (step ST24).

Then, the gain control part 24 checks whether it has received the light surge alarm signal 112 or not (step ST25), and if not, then performs its normal control operation (step ST26). When, on the other hand, having received the light surge alarm signal 112, the gain control part 24 decreases the drive current for the excitation light source (not shown) of the optical pre-amplifier 21 within a range in which to maintain the lowest possible level for reconstruction of the optical signal, thereby reducing the gain of the optical pre-amplifier 21 down to a level at which no light surge occurs, or a level at which no optical parts of the subsequent stages will be destroyed even if a light surge occurs (step ST27).

As described above, on detecting an optical signal fluctuation factor, the optical transmitting device 1a performs the light surge suppressing operation as is the case with the optical transmitting device 1 of FIG. 1, and at the same time, sends to an external device the light surge alarm signal 112 indicating the possibility of the occurrence of light surge. The optical receiving device 2 responds to the light surge alarm signal 112 to perform the light surge suppressing operation corresponding to the optical signal fluctuation which might be caused by the light surge suppressing operation of the optical transmitting device 1a. That is, since either of the optical transmitting device 1a and the optical receiving device 2 conducts the light surge suppressing operation prior to the occurrence of an optical signal fluctuation that causes a light surge, it is possible to enhance the reliability of suppression of light surge. Further, no complex control is involved and an optical part dedicated for the suppression of light surge, such as an optical attenuator, need not be inserted in the optical fiber 101 connected to the output of the optical booster amplifier 12 or the optical pre-amplifier 21, or in the optical fiber 101 forming the transmission line. Hence, it is possible to achieve high transmission performance with a simple device configuration.

Moreover, just as the case with the optical transmitting device 1 of FIG. 1, the optical transmitting device 1a in FIG. 4 also operates to suppress the occurrence of light surge in response to the optical transmitter mounted laser diode drive current abnormality warning signal, the optical transmitter mounted laser diode temperature abnormality warning signal and the optical connector mating/demating warning signal shown in FIG. 2. In this instance, as shown in steps ST4a and ST5a, the optical transmitter control part 13a supplies the external device with the light surge alarm signal 112 superimposed on the optical signal, thereafter applying the light surge warning signal 111 to the gain control part 14. The optical receiving device 2 extracts the light surge alarm signal 112 from the optical signal and similarly performs the light surge suppressing operation as well in the case of an optical signal fluctuation that might be caused when the optical transmitting device 1a deals with such optical signal fluctuation factor as the optical transmitter mounted laser diode drive current abnormality warning signal, optical transmitter mounted laser diode temperature abnormality warning signal, or optical connector mating/demating warning signal.

Incidentally, the optical transmitting device 1a in FIG. 4 may be configured such that the optical transmitter control part 13a uses the laser diode drive current or temperature monitor signal fed from the optical transmitter 11 to determine whether the laser diode becomes abnormal or not, and outputs the light surge alarm signal 112 and the light surge warning signal 111. Further, the optical receiving device 2 may also be configured to conduct the light surge suppressing operation after judging about the occurrence of fluctuation of the optical signal it receives, from the laser diode drive current or temperature monitor information contained in the monitor signal that is periodically sent from the optical transmitting device 1a. In the latter case, the received signal processing part 23 does not perform step ST 22 shown in FIG. 6 but instead makes a check to determine whether the content of the monitor signal indicating the drive current or temperature of the laser diode meets the precalculated condition for the laser diode to become abnormal, and if so, generates and applies the light surge alarm signal 112 to the gain control part 24.

In this embodiment 2 the light surge alarm signal 112 is superimposed on the optical signal, but the monitor signal may be sent via a separate communication channel. For example, in the case of a wavelength division multiplex multiplexing communication using one wavelength for the monitor signal, a wavelength separating filter or the like needs only to be provided in the received signal processing part 23 to extract the wavelength of the monitor signal.

As described above, according to this embodiment 2, the optical transmitting device 1a: prestores factors of fluctuation of the optical signal from the optical transmitter 11 to the optical booster amplifier 12 which cause a light surge in the output from the latter; upon detecting such an optical signal fluctuation factor, sends the light surge alarm signal 112 to the external device; and operates for suppressing or inhibiting the occurrence of light surge before the optical signal fluctuates. Hence, this embodiment increases the reliability of suppression of light surge, and neither involves such complex control as is needed in the prior art nor calls for inserting a dedicated optical part in the optical fiber 101 for the suppression of light surge, achieving high transmission performance with a simple device configuration. The optical receiving device 2 responds to the light surge alarm signal 112 to perform the light surge suppressing operation before it actually receives a level-fluctuating optical signal. This provides for increased reliability in the light surge suppression with less complex control than in the past, avoids the needs for inserting a dedicated optical part for the suppression of light surge in the stage following the optical pre-amplifier 21, hence achieving high transmission performance with a simple device configuration.

Embodiment 3

Figure 7:
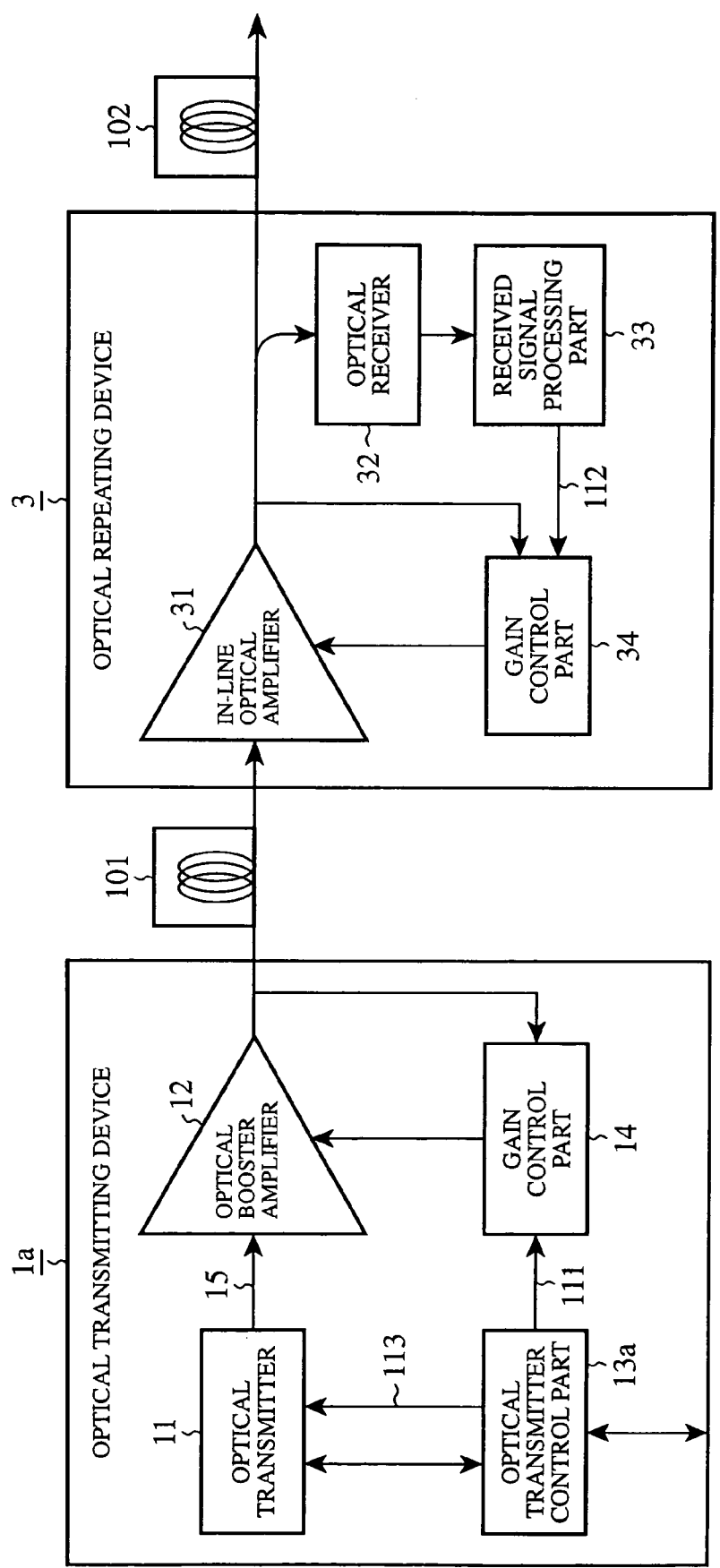
FIG. 7 is a block diagram illustrating the configuration of each of an optical transmitting device and an optical repeating device in an optical transmission apparatus according to a third embodiment of the present invention.

FIG. 7 illustrates in block form an optical transmitting device and an optical repeating device in an optical transmission apparatus according to a third embodiment (Embodiment 3) of the present invention. In FIG. 7 the parts identical with or corresponding to those in FIG. 4 are identified with the same reference numerals, and no description will be repeated. The optical transmitting device 1a is common in construction to the optical transmitting device 1a shown in FIG. 4. The optical transmitting device 1a and the optical repeating device 3 in this embodiment are illustrative of an optical transmission system configured to suppress the occurrence of light surge when the optical repeating device 3 is interposed between the optical transmitting device 1a and the optical receiving device 2 shown in FIG. 4.

In FIG. 7, the optical repeating device 3 comprises: an in-line optical amplifier 31 (corresponding to the optical amplifier) which receives an optical signal sent over the optical fiber 101 from the optical transmitting device 1a, and amplifies and outputs the received optical signal; an optical receiver 32 which receives a portion of the amplified repeated optical signal from the in-line optical amplifier 31 via an optical branching means (not shown); a received signal processing part 33 which extracts a monitor signal by signal processing of the repeated optical signal received by the optical receiver 32 and, when the content of the monitor signal is the light surge alarm signal 112, outputs the light surge alarm signal 112; and a gain control part 34 which when supplied with the light surge alarm signal 112, reduces the gain of the in-line optical amplifier 31.

Figure 8:
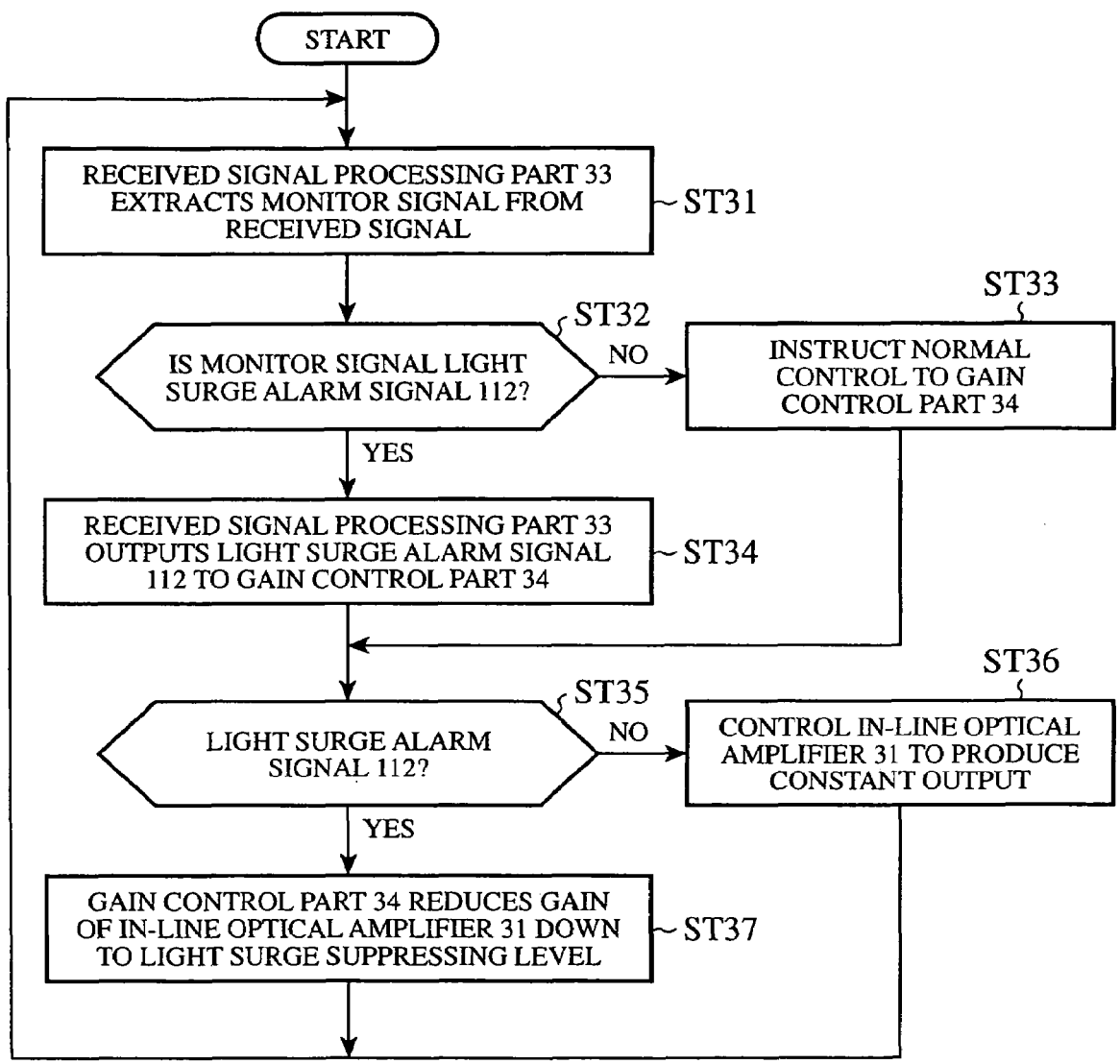
FIG. 8 is a flowchart explanatory of a light surge suppressing operation of the optical repeater unit shown in FIG. 7.

Referring next to FIG. 8, the operation of this embodiment will be described below. FIG. 8 is a flowchart showing the light surge suppressing operation by the optical repeating device 3. As for the light surge suppressing operation by the optical transmitting device 1a, refer to FIG. 5. No description will be repeated on the operation of the optical transmitting device 1a since it is the same as the operation of the optical transmitting device 1a in FIG. 4 described previously with reference to FIG. 5.

The in-line optical amplifier 31 of the optical repeating device 3 receives the optical signal sent over the optical fiber 101 from the optical transmitting device 1a, and amplifies it up to a level suitable for reception by an external device of the subsequent stage, thereafter outputting the amplified optical signal. The repeated optical signal amplified by the in-line optical amplifier 31 is mostly sent via an optical fiber 102 to the external device of the subsequent stage. The optical receiver 32 receives via an optical branching means (not shown) a portion of the repeated optical signal amplified by the in-line optical amplifier 31. Then the optical receiver 32 applies the repeated optical signal to the received signal processing part 34. The received signal processing part 34 performs signal processing of the received optical signal from the optical receiver 32 to extract a monitor signal (step ST31), then makes a check to determined whether the monitor signal contains the light surge alarm signal 112 or not (step ST32), and if not, instructs the gain control part 34 to perform its normal control operation (step ST33). When, on the other hand, the light surge alarm signal 112 is contained in the monitor signal, then the received signal processing part 33 provides the light surge alarm signal 112 to the gain control part 34 (step ST34).

Then, the gain control part 34 checks whether it has received the light surge alarm signal 112 or not (step ST23), and if not, then performs its normal control operation (step ST36). However, when the gain control part 34 has received the light surge alarm signal 112, it decreases the drive current for an excitation light source (not shown) of the in-line optical amplifier 31 within a range in which to maintain the lowest possible level for reconstruction of the optical signal, thereby reducing the gain of the in-line optical amplifier 31 down to a level at which no light surge occurs, or a level at which no optical parts of the subsequent stages will be destroyed even if a light surge occurs (step ST37).

Incidentally, in the case where the optical repeating device 3 is followed by a similar optical repeating device (not shown), the optical signal containing the light surge alarm signal 112 from the optical transmitting device 1a is amplified by the in-line optical amplifier 31 and then applied to the optical repeating device of the following stage, which also suppresses the occurrence of light surge in the same manner as described above. In the case where the optical receiving device 2 shown in FIG. 5 is placed at the stage following the optical repeating device 3, too, the optical receiving device 2 can similarly perform the light surge suppressing operation since the light surge alarm signal 112 is contained in the optical signal that is sent to the device 2.

Moreover, even if the optical transmitting device 1a detects any one of the optical signal fluctuation factors shown in FIG. 2 and operates to suppress the occurrence of light surge, the optical repeating device 3 also similarly suppresses the occurrence of light surge since the optical signal from the optical transmitting device a contains the light surge alarm signal 112.

The optical repeating device 3 shown in FIG. 7 may also be configured to conduct the light surge suppressing operation after judging about the occurrence of fluctuation of the optical signal it receives, from the laser diode drive current or temperature monitor information contained in the monitor signal that is periodically sent from the optical transmitting device 1a. In the latter case, the received signal processing part 33 does not perform step ST 32 shown in FIG. 8 but instead makes a check to determine whether the content of the monitor signal indicating the drive current or temperature of the laser diode meets the precalculated condition for the laser diode to become abnormal, and if so, generates and applies the light surge alarm signal 112 to the gain control part 34.

In this embodiment, too, the light surge alarm signal 112 need not necessarily be superimposed on the optical signal, but instead the monitor signal may be sent via a separate communication channel. For example, in the case of a wavelength division multiplex multiplexing communication using one wavelength for the monitor signal, a wavelength separating filter or the like needs only to be provided in the received signal processing part 33 to extract the wavelength of the monitor signal.

As described above, according to this embodiment, just as the case with the optical transmitting device 1a in FIG. 4, the optical transmitting device 1a: provides increased reliability in the suppression of light surge; and neither involves such complex control as is needed in the prior art nor calls for inserting a dedicated optical part in the optical fiber 101 for the suppression of light surge, achieving high transmission performance with a simple device configuration. The optical receiving device 2 amplifies the optical signal containing the light surge alarm signal 112 from the optical transmitting device 1a and outputs the amplified optical signal to the external device at the following stage, and at the same time, responds to the light surge alarm signal 112 to perform the light surge suppressing operation; therefore, this device also increases the reliability of the light surge suppression with less complex control than in the past, avoids the needs for inserting a dedicated optical part for the suppression of light surge in the stage following the in-line optical amplifier 31, hence achieving high transmission performance with a simple device configuration.

What is claimed is:

1. An optical transmission apparatus comprising:
   an optical transmitter configured to output an optical signal;
   an optical amplifier configured to amplify and output the optical signal from said optical transmitter;
   a light surge suppressing control part which, upon detecting an optical signal fluctuation factor that causes a future fluctuation of a future optical signal to be input from said optical transmitter to said optical amplifier, the optical signal fluctuation factor being independent of a present optical signal, is configured to output a light surge warning signal before said optical signal fluctuation; and
   a gain control part configured to respond to said light surge warning signal to reduce the gain of said optical amplifier.

2. The optical transmission apparatus of claim 1, wherein said gain control part is configured to respond to said light surge warning signal to reduce the gain of said optical amplifier down to a level where no light surge occurs, or a level where the peak value of a light surge will not destroy an optical part at a stage following said optical amplifier.

3. The optical transmission apparatus of claim 1, wherein said optical signal fluctuation factor is a control signal for said optical transmitter which causes a fluctuation in the output from said optical transmitter, and said light surge suppressing control part has a function of controlling said optical transmitter and responds to said control signal to output the light surge warning signal prior to controlling said optical transmitter by said control signal.

4. The optical transmission apparatus of claim 3, wherein when said light surge suppressing control part is configured to receive any one of a transmission start/stop control signal for said optical transmitter, an optical signal output level change control signal and an optical signal format change control signal, the light surge suppressing control part is configured to output said light surge warning signal prior to controlling said optical transmitter by said any one control signal.

5. The optical transmission apparatus of claim 3, wherein said light surge suppressing control part is configured to stop outputting said light surge warning signal after completion of the output fluctuation by said control signal, allowing said gain control part to restore the gain of said optical amplifier to its normal level.

6. The optical transmission apparatus of claim 1, wherein said optical signal fluctuation factor is a status change of said optical transmitter which can cause an output variation of said optical transmitter, and said light surge suppressing control part is configured to output said light surge warning signal upon receiving a monitor signal indicating said status change.

7. The optical transmission apparatus of claim 3, wherein said light surge suppressing control part is configured to prestore, as optical signal fluctuation factor information, factors for causing a change in the output from said optical transmitter, and is configured to output said light surge warning signal when said control signal or monitor signal coincides with said optical signal fluctuation factor information.

8. The optical transmission apparatus of claim 1, wherein said optical signal fluctuation factor is mating/demating of an optical connector inserted in an optical fiber interconnecting said optical transmitter and said optical amplifier, and said light surge suppressing control part is configured to respond to a mating/demating warning signal warning mating/demating of said optical connector to output said light surge warning signal prior to mating/demating of said optical connector.

9. The optical transmission apparatus of claim 1, wherein upon detecting said optical signal fluctuation factor, said light surge suppressing control part is configured to output said light surge warning signal after sending, as monitor information, to an external device a light surge alarm signal indicating the possibility that an optical signal containing a light surge is sent.

10. The optical transmission apparatus of claim 9, wherein said light surge suppressing control part is configured to output said light surge alarm signal so as to superimpose it on the optical signal to be output from said optical transmitter and is configured to send the thus superimposed signal to said external device.

11. The optical transmission apparatus of claim 10, wherein said light surge suppressing control part is configured to output said light surge warning signal after sending to said external device said light surge alarm signal superimposed on said optical signal.

12. An optical transmission apparatus comprising:
   an optical amplifier configured to amplify and output received optical signal;
   a received signal processing part configured to extract monitor information from the amplified received optical signal that is the output from said optical amplifier; and
   a gain control part configured to control the gain of said optical amplifier;
   wherein said monitor information is a light surge alarm signal indicating the possibility of a future light surge being included in a future optical signal to be received, said received signal processing part is configured to apply said light surge alarm signal to said gain control part, and said gain control part responds to said light surge alarm signal to reduce the gain of said optical amplifier.

13. The optical transmission apparatus of claim 12, wherein said optical amplifier is configured to be connected in in-line fashion to a receiving optical fiber for receiving an optical signal from the outside and a transmitting optical fiber for transmitting an optical signal to the outside, and said received signal processing part is configured to extract said monitor signal from the amplified received optical signal applied thereto via an optical branching means inserted in said transmitting optical fiber.

14. The optical transmission apparatus of claim 12, wherein said gain control part is configured to respond to said light surge alarm signal to reduce the gain of said optical amplifier down to a level where no light surge occurs, or a level where the peak value of a light surge will not destroy an optical part at a stage following said optical amplifier.

* * * * *